Sept. 28, 1965        K. G. KREUTER        3,208,466

DIFFERENTIAL PRESSURE CONTROL

Filed Jan. 11, 1963        5 Sheets-Sheet 1

INVENTOR.
Kenneth G. Kreuter

BY

ATTORNEY

Sept. 28, 1965        K. G. KREUTER        3,208,466

DIFFERENTIAL PRESSURE CONTROL

Filed Jan. 11, 1963        5 Sheets-Sheet 2

INVENTOR.
Kenneth G. Kreuter
BY
*Herbert M Birch*
ATTORNEY

Sept. 28, 1965  K. G. KREUTER  3,208,466
DIFFERENTIAL PRESSURE CONTROL
Filed Jan. 11, 1963  5 Sheets-Sheet 3
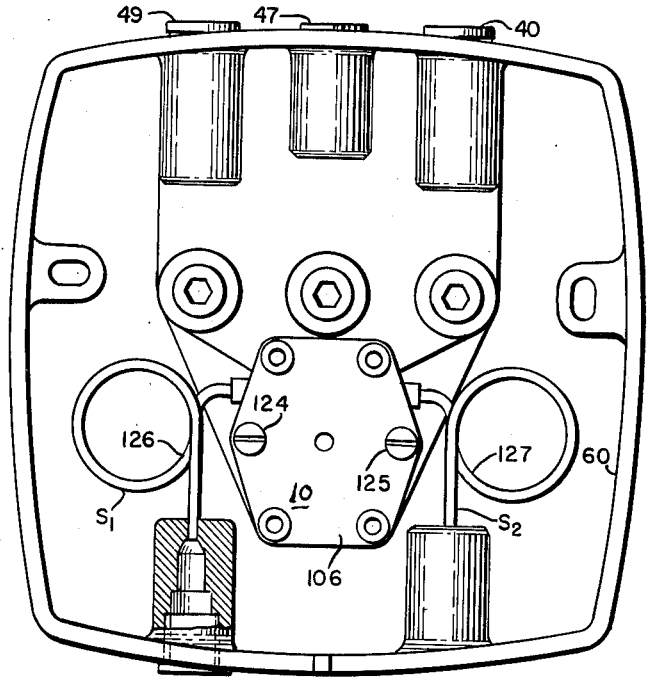
FIG.5.
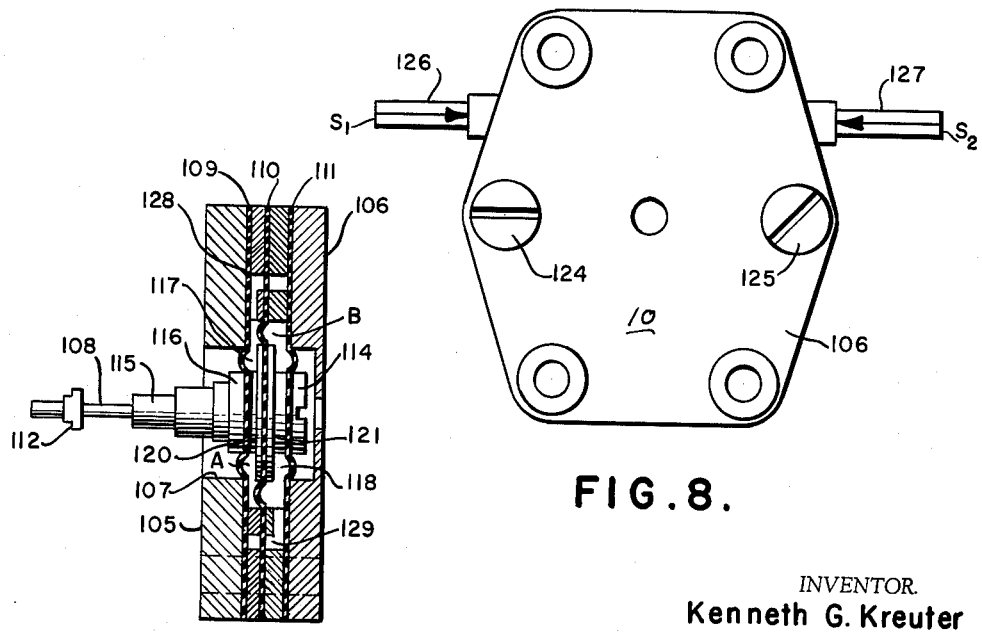
FIG.8.
FIG.9.
INVENTOR.
Kenneth G. Kreuter
BY
ATTORNEY Sept. 28, 1965                K. G. KREUTER                3,208,466
                       DIFFERENTIAL PRESSURE CONTROL
Filed Jan. 11, 1963                                   5 Sheets-Sheet 4

INVENTOR.
Kenneth G. Kreuter
BY
ATTORNEY

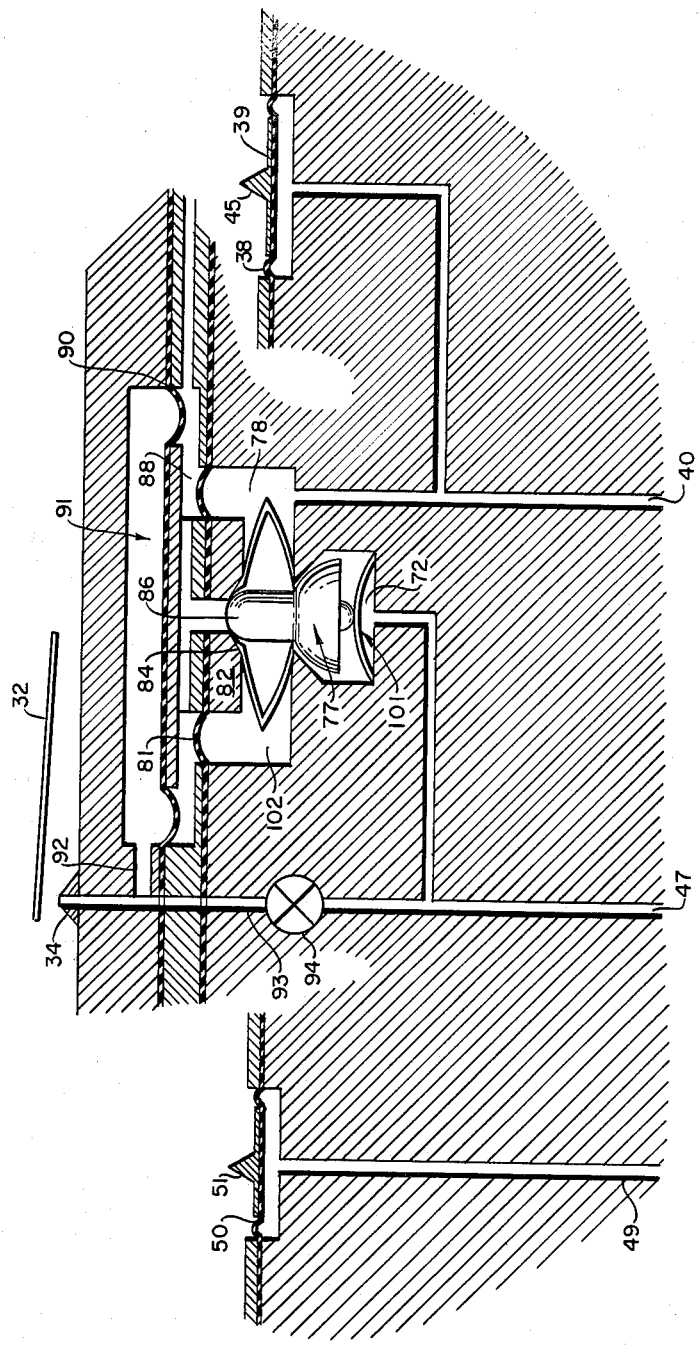

United States Patent Office 3,208,466
Patented Sept. 28, 1965

3,208,466
DIFFERENTIAL PRESSURE CONTROL
Kenneth G. Kreuter, Goshen, Ind., assignor to Robertshaw Controls Company, Richmond, Va., a corporation of Delaware
Filed Jan. 11, 1963, Ser. No. 250,944
13 Claims. (Cl. 137—85)

This invention is a continuation-in-part of my prior copending application Serial No. 175,979, filed February 27, 1962, entitled, "Remote Bulb Temperature Controller," which relates to a pneumatic controller for sensing conditions in accordance with a desired measured value.

The invention is similar in general structure and operation to my first invention except that in the present instance the remote bulb temperature controller is removed and replaced by a differential pressure input device. Thus, an object of this invention is to operate a pneumatic controller from a pressure sensor adapted to sense the difference between two pressures from different sources and to feed the resultant differential of the sensed two pressures through a novel compactly positioned pick-up linkage system of the controller to control the branch output pressure of the controller.

Another object is to provide in a pneumatic controller a multiple diaphragm input unit having pressure inlets to receive pressure derived from the high and low side of a refrigeration coil, whereby said inputs are increased in proportion to difference in said pressures on opposed sections of said diaphragms of the unit and which unit then transmits the resultant differential as movement through an input lever system to control branch output pressure.

Other objects of this invention are to provide a novel changeover lever arrangement for air temperature control systems, adapted to control either the heating cycle or the cooling cycle for conditioning the air in an enclosure, whereby changeover is accomplished by a single lever upon minor adjustment thereof to change the controller from direct action for the heating cycle to reverse action for the cooling cycle. Thus with the pressure controller responsive to the high and high low pressure inputs of a cooling coil or the like the output pressure of the pneumatic controller can be made to either increase or decrease proportionally.

With the above and other objects and advantages of the invention in view, the invention is best understood by reference to the following drawings, wherein a complete embodiment of the invention is illustrated.

In the drawings:

FIGURE 5 is a bottom plan view of the control unit showing the various conduit connection locations;

FIGURE 7 is an enlarged diagrammatic view of the pneumatic relay means and the source of supply and output connections thereof;

FIGURE 8 is a bottom plan view of the present invention differential pressure input control unit; and FIGURE 9 is a cross section view of the control unit taken on section line 9—9 of FIGURE 8.

Figure 6:
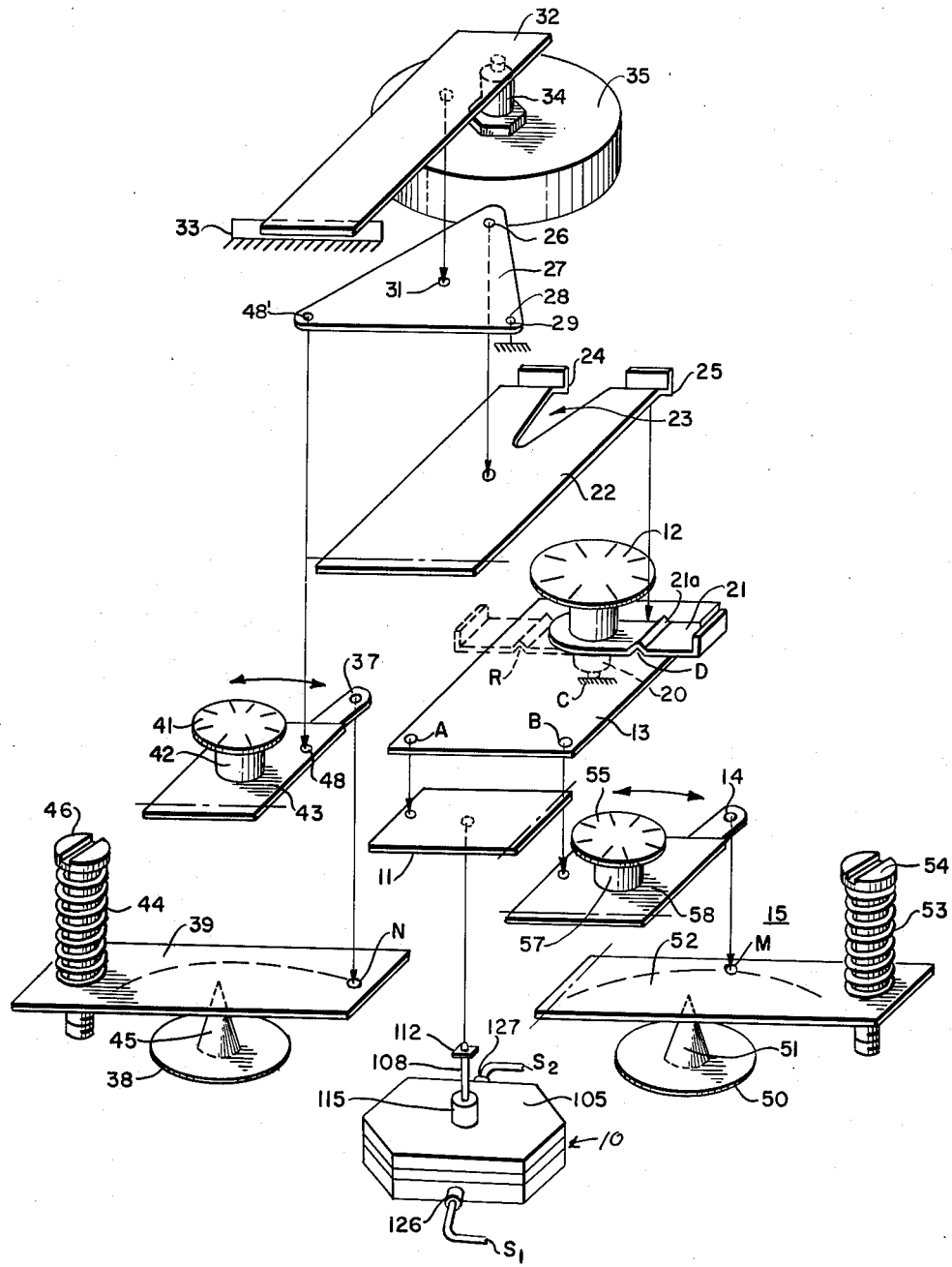
FIGURE 6 is a diagrammatic view of the elements of the pneumatic control unit pulled apart and juxtapositioned in their respective operative positions.

First with particular reference to FIGURE 6 of the drawings, the objects of this invention are attained by providing a differential pressure control 10 comprising stacked diaphragms operatively associated by an input assembly with an input lever 11, a manually controlled value measuring means, such as a set-point dial 12 operatively connected to a set-point lever 13 having a plurality of lever connecting points A, B and C for pivotal connection at point A to the input lever 11 and with a lever 14 of a sub-master control means 15 at point B. The set-point dial 12 connects to set-point lever 13 at point C by a dial screw 20.

Mounted on the set-point dial screw 20 for pivotal swinging movement is a changeover lever 21, which is movable from a position marked R at a corner of set-point lever 13, see the dotted line position thereof in FIGURE 6, to a position marked D at the transversely opposite corner of the set-point lever 13.

Superimposed above the changeover lever 21 on the dial screw 20 is a reverse acting and direct acting cooperating lever 22 having a bifurcated portion 23 formed with transversely spaced knife edge cams 24 and 25. These cams are selectively engaged by a similar opposed upstanding cam 21a formed intermediate the end of the changeover lever 21, see FIGURES 3, 4 and 6.

Figure 1:
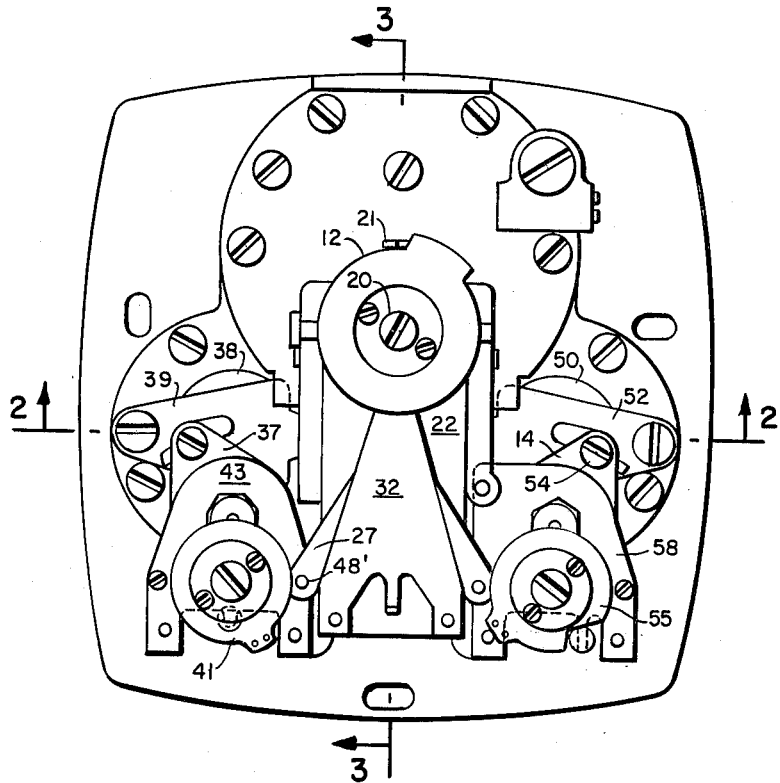
FIGURE 1 is a top plan view of the present pneumatically operated control with the cover removed.
Figure 2:
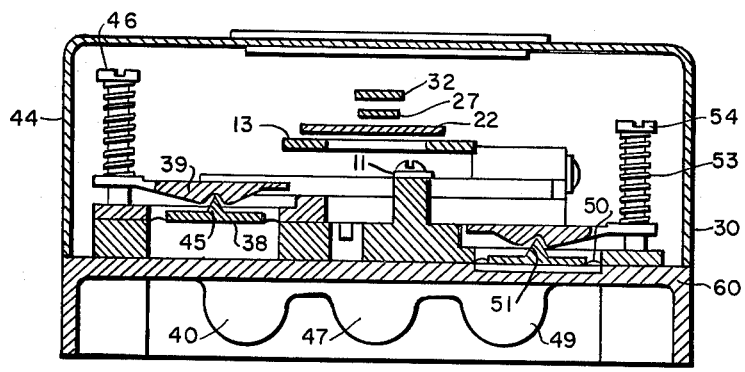
FIGURE 2 is a cross section view of FIGURE 1 taken on line 2—2, but with the unit cover applied.
Figure 3:
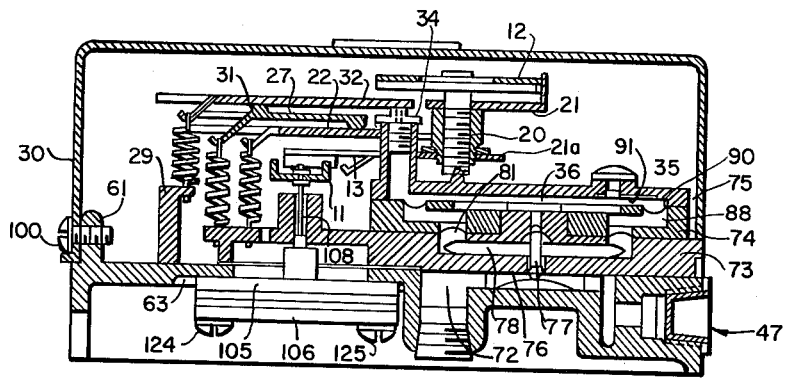
FIGURE 3 is a cross section view taken on line 3—3 of FIGURE 1.
Figure 4:
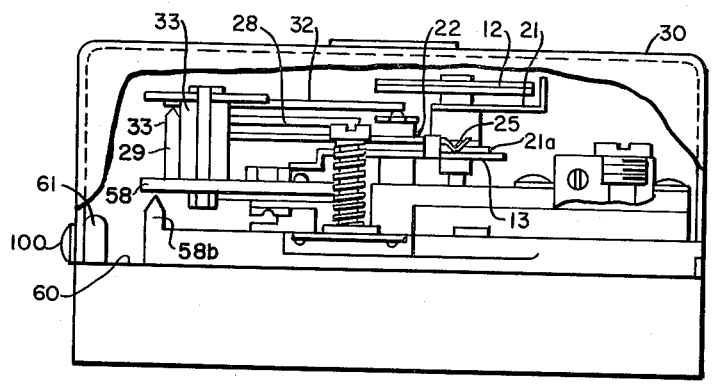
FIGURE 4 is an end view in elevation of FIGURE 3 with a portion of the unit cover broken away.

As a result of the movement of changeover lever 21 and its selective cam-to-cam engagement with the co-operating lever 22, motion is imparted to a raised bearing point 26 of a triangular output lever 27, which output lever rests on a stationary pivot 28 on a suitable supporting frame 29 enclosed in the controller unit cover 30, see FIGURES 3 and 4. A centrally positioned bearing lug 31 is provided on said output lever and is in contact with a medial under portion of a leakport flapper 32, whereby movement of said output lever about a pivot 28 may cause displacement of the flapper 32.

Figure 3A:
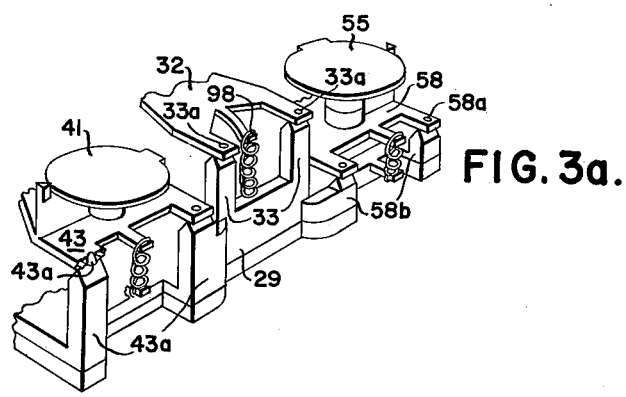
FIGURE 3a is a rear perspective view of the control unit showing a detail of same of the hinge means for the lever means thereof.

This lever or flapper 32 is pivotally connected by a spring biased hinge pivot at one end to upright means 33, see FIGURE 3a, from the instrument frame means 29 and the resultant pivotal movement thereof selectively impedes the flow of fluid from the leakport nozzle 34 of a pneumatic relay 35, see FIGURES 3, 4 and 6.

Such impedance to the flow at the leakport nozzle 34 controls the pressure in the relay pilot chamber, see FIGURES 3 and 7, as hereinafter explained. As a result pressure in the feedback line to a feeback diaphragm 38 is varied in proportion to the flapper position and also the pressure in the output or branch line 40 changes accordingly, see FIGURES 6 and 7. Further control of desired sensitivity may be provided by the setting of the throttling range dial 41 rotatably mounted on a dial screw 42 upstanding from a plate 43 positioned by pins 43a to pivot on knife edges at the top of upright means 43b and below which the feedback lever 37 is movable to right or left in contact with the hinged diaphragm plate 39, see FIGURE 3a.

The setting of the dial 41 causes movement of the feedback lever 37 between hinged plate 43 and the feedback diaphragm plate 39, which movement may be either to the right or left of a neutral position for a pick-up point N, as desired. As the lever 37 is moved over the feedback diaphragm plate 39, said plate 39 is moved by thrust button 45 against the biasing action of an adjustable range spring 44 on a screw 46, to thereby control the feedback according to the setting of the throttling range dial 41.

For example, movement of the lever 37 to the right provides a positive feedback for two-position control, that is on-off operation, with the output pressure of line 40 either equal to the supply pressure which is supplied at 47 or zero with a differential as indicated on the throttling range dial 41 and movement to the left provides negative feedback for modulating control, whereby the output pressure changes gradually with pressure or temperature.

The feedback assembly is coupled from an intermediate bearing point 48 on the throttling range lever 43 of the said feedback assembly to a cooperating bearing point 48' comprising the third apex or corner of the triangular output lever 27.

Still with reference to FIGURES 6 and 7, the sub-master assembly 15 of the control includes a sub-master diaphragm 50 with a thrust button 51 in engagement with an elongated hinged plate 52. The plate 52 and diaphragm movement are opposed by an adjustable range spring 53 coiled on a screw 54 threaded into the plate adjacent one end thereof. A sub-master range control dial 55 rotatable on a dial screw 57 is supported by a hinged support plate 58 positioned by said pins 58a so as to pivot on the knife edges at the top of uprights 58b, see FIGURE 3a. The sub-master set-point lever 14 is pivotally mounted on the dial screw 57.

The transmission of sub-master lever movement to bearing point B of the set-point lever 13 is a regulated by positioning the pick-up point M from a neutral position on hinged plate 52 back and forth as plate 52 is moved, thus proportionally picking up more or less of the movement supplied by the submaster diaphragm. With the pickup point M exactly on the line of pivot of the sub-master diaphragm lever 14 at neutral position, no movement is imparted to the set-point lever 13 at point B thereof.

Thus the sub-master assembly may or may not be combined into the control operation.

The foregoing elements are all mounted on a suitable flanged supporting base 60, with several threaded apertured lugs 61 at the peripheral edge thereof, see FIGURES 3 and 5. For example, the differential pressure input element 10 is supported by a plate 62 and is suitably secured in an offset countersunk portion 63 to the flanged side of the base 60 by screws 124 and 125 to the base, see FIGURE 5. The element 10 includes an operating shaft 108 engageable with the flexure hinged control input lever 11, see FIGURE 6.

Offset from the input element mounting on the under side of the base plate 60 is the pneumatic relay 35. This relay is formed with a main air supply chamber 72, which is formed on the opposite or upper side of the base 60, see FIGURES 3 and 7. The air supply chamber provides the lower portion of the pneumatic relay 35. This relay is comprised of three stacked spaced apart plates 73, 74 and 75 with diaphragm means secured therebetween. These diaphragms are arranged to provide the lower main air supply chamber 72, the main valve seat 76 and main valve 77 opening to the vertically aligned branch chamber 78 connecting with the line 40 and feedback diaphragm 38, the exhaust chamber 79 with the branch chamber and exhaust chamber dividing wall formed by a diaphragm 81 carrying a valve disc 82 formed with a central valve seat 84 carried by the diaphram, and the upper pilot chamber 91 to the leakport 34, see FIGURES 3 and 7. The disc valve seat 84 coacts with the upper valve head 86 of the main valve 77 to open into the exhaust chamber 88. The upper wall of the exhaust chamber comprises a diaphragm 90 and serves as the bottom wall of the relay pilot chamber 91, which connects at duct 92 to leakport nozzle 34.

The leakport nozzle 34 includes a conduit 93 from a suitable restrictor means, such as a needle valve 94, see FIGURE 7, and the main air supply line 47 connects to the needle valve and also to the main air supply chamber 72.

Each of the levers 22, 27 and 32 are similarly pivoted on suitable spaced upright means from the base of the instrument, such as uprights 33 on the base 60 and are biased into their respective normal positions by their coil springs 96, 97 and 98, see FIGURE 3. The uprights 33, for example, for lever 32 as shown in FIGURE 3a include position or locating pins 33a to retain the lever arms of lever 32 upon the top knife edges of the respective uprights 33. Thus flapper 32 is normally biased to close the leakport nozzle 34 and the flapper lever 32 movement is set by the set-point lever and the position of the associated lever systems, whereby the position thereof will through the relay 35 control the output or branch pressure to operate a suitable pneumatic valve, not shown, in the heating or cooling system. The levers of the lever system operate to correspond to the set-point value for either modulating when the feedback means is in the system or two-position control as selected when the feedback means is set at neutral.

The entire lever mechanism and relay means are enclosed by the cover 30, which is secured to the lugs 61 by suitable screw means 100, see FIGURES 3 and 4.

The relay 35 is supplied with compressed air from main line 47 into the main air supply chamber 72 and the main air supply also passes through the restriction provided by the needle valve 94 and to the nozzle 34. The pivoted flapper 32 controls the air pressure in the nozzle conduit and the relay pilot chamber 91. The pressure in the pilot chamber 91 acts upon the diaphragm 90 of the relay 35, and thereby regulates the exhaust from chamber 88 and the position of the disc valve 82 with respect to the main valve 77, whereby output pressure to branch line 40 and the feedback line to feedback diaphragm 38 is varied according to the set-point value of the lever system.

The remote control or sub-master control unit is controlled through a separate pressure line 49 from a suitable sensing device, not shown, to its diaphragm.

The main relay valve is normally spring biased by a spring 101 to closed position and is movable in a bellows type diaphragm 102 confined in the branch or output chamber 78, which expands and contracts according to main line pressure, whereby these pressures may be balanced so the control is highly sensitive to very small motions and adjustments of the several interconnected lever means hereinbefore described. Such lever means are the main features of this invention and the operation of the novel control lever means is described in detail hereinafter under the heading of "Operation."

Now with particular reference to the differential pressure unit assembly shown in FIGURES 6, 8 and 9, the same comprises a top plate 105 and a bottom plate 106. The top plate is formed with a central opening 107 through which extends the thrust shaft 108 of an input assembly secured to a plurality of superimposed diaphragms 109, 110 and 111. The thrust shaft 108 is formed on its free extended end with a coupling element 112 to connect with the input lever 11 of the main control and is formed with screw threads, not shown, and a screw head 114. The shaft screw feeds through the threaded bore of a bushing 115 having a relatively larger base 116 which seats against the outer center portion of the top diaphragm 109. Concentrically mounted around the thrust shaft 108 are aligned press plates 117 and 118 between which is sandwiched the center portion of the diaphragm 110.

From the opposite faces of each press plate is an annular flat button-like projection 120 and 121, respectively. The button-like projection 120 coacts with the base 116 to clamp the center portion of diaphragm 109 therebetween and the button-like projection 121 coacts with the head 114 to clamp the center portion of the diaphragm 111 therebetween, thereby resulting in a floating diaphragm mounting for the thrust shaft 112 and bushing 115.

Intermediate plates 122 and 123 are interposed or stacked between the diaphragms so that plate 122 is between diaphragm 109 and diaphragm 110 and plate 123 is between diaphragm 110 and diaphragm 111 and secured in this position by suitable means, such as bolts or screws 124 and 125 threadable through aligned threaded bores in the top and bottom plates 105 and 106 and correspondingly aligned openings through the intermediate plates and their respectively adjacent diaphragms.

Inlet nipples 126 and 127 lead into the superimposed spaces A and B between the diaphragms 109–110 and 110–111 through respective ducts 128 and 129.

The effective area of diaphragms 109 and 110 in this instance, for example, are arranged to have a difference of 2.4 to 1, whereby a pressure $S_1$ coming in the intake nipple 126 and a pressure $S_2$ coming in the intake nipple 127 are proportioned and transmitted as movement to the diaphragm supported input assembly with the thrust shaft assembly thus imparting the motion to the input lever 11 of the pneumatic control system.

Operation

Briefly reviewing the operation of the present novel differential pressure unit and connected pneumatic controller with reference in particular to FIGURE 6, the differential pressure control 10 through thrust assembly 112–115 pushes up on the input lever 11. The resulting movement of the lever is multiplied, for example, approximately 4:1 and is fed into one corner of the rectangular set-point lever 13.

The set-point lever is resting on three triangularly arranged points A, B and C, on the input lever 11 at corner point A, on the sub-master lever 58 at corner point B, and the end of the set-point dial screw 20 at point C.

The two free corners or remaining corners of lever 13 are for illustration, referenced R and D, respectively, and are transversely opposite each other on each side of the point C midway therebetween. The corner D is for alignment reference with the changeover lever 21 for direct action of the pneumatic control while the corner R is for alignment reference with the changeover lever when shifted for reverse action of the pneumatic control and vice versa.

The resultant movement of changeover lever 21 from point D or point R is imparted to direct or reverse acting lever 22 and is transmitted to the triangular output lever 27 at point 26 thereof, said lever having a fixed pivot point 28 to frame means 29 and a third point resting on the feedback lever 43. The resultant movement of the output lever 27 is imparted from its centrally positioned lug 31 to the leakport lever or flapper 32.

Any such imparted movement of the flapper 32 opens or closes the leakport of nozzle 34, which for example operates a 2:1 ratio relay, such as generally is referenced 35, see FIGURES 3 and 7. This leakport control action determines the branch output pressure in line 40.

The set-point lever 13 at point B rests upon the sub-master or remote control lever 58 and the movement of the sub-master lever and assembly is regulated by moving the pickup point M of the assembly back and forth through lever 14. This movement or displacement of the pickup point M by the swinging action of lever 14 thus picks up more or less of the movement supplied by the sub-master diaphragm 50 connected to pressure sensing line 49. The movement of the diaphragm 50 is opposed by the range spring 53 by means of an adjusting screw 54. When the pickup point M is positioned exactly on the line of pivot of the sub-master diaphragm lever 52, no movement is imparted to the set point lever 13 and the same is inactive.

Now considering the feedback assembly, the feedback movement transmitted to the throttling range plate 43 from feedback diaphragm 38 is regulated by the position of the pickup point N at the feedback diaphragm plate 39, as the feedback lever 37 is moved back and forth. This movement provides for proportionally picking up more or less of the movement supplied by the feedback diaphragm 38.

The range of movement of the diaphragm is adjustable according to the setting of the range spring 44, which is coiled onto the headed adjusting screw 46 threaded into an end of the diaphragm plate 39. The throttling range dial 41 and the feedback lever 37 are movable to position the pickup point N, so that when this point is exactly on the line of pivot of the feedback diaphragm, the lever is in neutral position and no feedback movement is imparted to the output lever 27. Thus movement to the right of the said neutral position of the point N provides positive feedback for two-position operation, while movement to the left of the neutral position of point N provides negative feedback for modulating operation.

Without further description it is believed that the advantages of the present invention over the prior art is apparent and while only one embodiment of the same is illustrated, it is to be expressly understood that the same is not limited thereto as various changes may be made in combination and arrangement of the parts illustrated, as will now likely appear to others and those skilled in the art. For a definition of the scope or limits of the invention, reference should be had to the appended claims.

What is claimed is:

1. In a pneumatic control apparatus comprising a casing for housing in a compact assembly adaptable for either modulating or two position control as selected, means for establishing an output control pressure variable in response to a difference between two pressure inputs into a single unit and being measured for the purpose of controlling said output control pressure; said means comprising a superimposed lever system of plates, one of said plates being an input plate connected to said single unit, a triangular output plate pivoted at the apex of one corner thereof to a supporting base and a plurality of intermediate plates, operatively associated between said input and output plates, said triangular output plate at a second corner at the apex thereof having a bearing point engageable with a next adjacent intermediate plate, a third corner at the apex thereof having a bearing point engaging a throttling range lever, a differential pressure responsive means, said means having a thrust assembly carried thereby engaged with the input lever plate of said system, one of said intermediate plate levers being a set point lever, indicator means connected to said set point lever for setting the value at which said output control pressure is to be established, said set point lever plate being engageable with said input lever plate for movement thereby, a pilot valve positioned in said casing above said triangular output lever plate and having a control means, said control means being engaged with a forth bearing point of said triangular output lever plate in accordance with the forces applied by said thrust assembly carried by said differential pressure responsive means to said input lever plate and operatively associated intermediate plates, and a pneumatic relay having a main fluid supply line and a fluid output line, the output of said output line being proportional to the positioning of said pilot valve control means by said triangular output lever of the lever system.

2. In a pneumatic control apparatus comprising a casing for housing in a compact assembly adaptable for either modulating or two position control as selected, means for establishing an output branch pressure variable in response to a difference between two pressure inputs into a single unit being measured for the purpose of controlling said output branch pressure, said means comprising a superimposed lever system of plates, one of said plates being an input plate connected to said single unit, a triangular output plate pivoted at the apex of one corner thereof to a supporting base and a plurality of intermediate plates, operatively associated between said input and output plates, said triangular output plate at a second corner at the apex thereof having a bearing point engageagle with a next adjacent intermediate plate, a third corner at the apex thereof having a bearing point engaging a throttling range lever, a differential pressure responsive means, said means having a thrust assembly operatively engaged with the input lever plate of said system, one of said intermediate plate levers being a set point lever, operatively connected means to said set point lever for setting the said lever to a value at which said output pressure is to be established, said set point lever plate being engageable with said input lever plate for movement thereby, a pilot valve positioned in said casing above said triangular output lever plate and having a control means, said control means being engaged with a forth bearing point of said triangular output lever plate in accordance with the forces applied by said differential pressure responsive means to said input lever plate and operatively associated intermediate plates, and a pneumatic relay having a main fluid supply line and a fluid output line, the output of said output line being proportional to the positioning of said pilot valve control means by said triangular output lever, said intermediate output pressure value setting plates being controlled by said operatively connected set point control means, said set point control means comprising a set point indicator dial, and a shaft rotatably supporting said dial for adjustment of said dial to establish set point values of output pressure.

3. In a pneumatic control apparatus as described in claim 1, wherein said pilot valve comprises a flapper means and a nozzle from a pressure conduit leading from the main supply line of said pneumatic relay and a restrictor means in said main line of pressure supply.

4. In a pneumatic control apparatus as described in claim 3, wherein said restrictor means in said main supply line to said nozzle is a fluid restriction valve.

5. In a pneumatic control apparatus, as described in claim 1, wherein said differential pressure responsive means is a pressure sensing element having a thrust means engageable with the lower side of said input lever.

6. In a pneumatic control apparatus comprising a casing for housing in a compact assembly adaptable for either modulating or two position control as selected, means for establishing an output control pressure variable in response to an output control pressure being measured for the purpose of controlling said condition, said means comprising a superimposed lever system having an input lever, an output lever and a plurality of intermediate levers operatively associated between said input and output levers, a differential pressure responsive means connected to two pressure sources, said differential pressure means having superimposed diaphragms to provide high and relatively low pressure chambers between said diaphragms, a thrust assembly carried by said diaphragms for said superimposed lever system, operatively engaged with the input lever of said system, one of said intermediate levers being a set point lever operatively connected between said input and output levers for setting the value at which said output pressure is to be established, said set point lever being engageable with said input lever for movement thereby, a pilot valve positioned in said casing above said output lever and having a control means, said control means being movable by said output lever in accordance with the forces applied by said differential pressure responsive means to said input lever and operatively associated intermediate levers, and a pneumatic relay having a main fluid supply line and a fluid output line, the output of said output line being proportional to the positioning of said pilot valve control means by said output lever, said intermediate output pressure value setting levers being controlled by a set point lever control means, said set point control means comprising a set point indicator dial, a shaft rotatably supporting said dial for adjustment of said dial to establish set point values of output pressure to the set point lever, a reverse acting or direct acting lever pivotally mounted above said set point lever, an elongated changeover lever pivotally mounted at one end of said set point dial shaft, said changeover lever and said reverse acting and direct acting lever each having coacting cam means on opposed alignable surfaces thereof, whereby aligned contact of the cam means of said changeover lever with the cam means of said reverse acting and direct acting lever serves to change the operation of said control apparatus levers from reverse action to direct action of said pilot valve control means or vice versa, said last-mounted lever having an output bearing point engageable with a predetermined portion of said output lever.

7. In a pneumatic control apparatus as described in claim 1, wherein said output lever is triangular and is pivoted at the apex of one corner thereof to a supporting base and is formed on an adjacent corner thereof with a bearing point on the lower side engageable with a next adjacent intermediate lever, and said output lever is formed with a bearing point intermediate the apices thereof on the upper side engageable with the intermediate lower side of said pilot valve control means.

8. In an air conditioning system, a pneumatic control unit for controlling pneumatic output operating pressure having a differential pressure unit responsive to the high or low side of a refrigeration coil or the like, in the air conditioning system, said control comprising a leakport and a flapper valve therefor, a linkage motion transmitting system actuated by said elements, said linkage system having an input lever movable by said differential pressure unit, said linkage system having an output lever connecting with said flapper valve for controlling the position of said flapper valve proportional to a sensed condition of said element, a single lever in said linkage system adapted to shift said linkage from actuation of said flapper valve in one direction to an actuation thereof in a reverse direction, a pneumatic relay means, said leakport being connected to said relay means, a source of motive fluid supply from a supply line connected to said relay means and an output pressure branch line connected to said supply line, said branch line being connected to suitable control valve means or the like in the said air conditioning system.

9. In an air conditioning system, a pneumatic control unit for controlling pneumatic output operating pressure having a fluid pressure relay unit with differential diaphragm means with a thrust assembly, said control comprising a leakport and a flapper valve therefor, a linkage motion transmitting system actuated by said diaphragm means, said linkage system having an input lever movable by said thrust assembly of said differential diaphragm means, said linkage system having an output lever connecting with said flapper valve for controlling the position of said flapper valve proportional to a transmitted pressure differential of said diaphragm means, a single changeover lever in said linkage system adapted to shift said linkage from actuation of said flapper valve in one direction to an actuation thereof in a reverse direction, a pneumatic relay means, said leakport being connected to said relay unit, a source of motive fluid supply from a supply line connected to said relay unit and a output pressure branch line connected to said supply line, said branch line being connected to suitable control valve means or the like in the said air conditioning system, said single lever being mounted on a bushing rotatable on a concentrically positioned control shaft of set point control means, said set point means including a set point dial turnable with said bushing on said shaft, and a rectangular lever formed on its lower side with a bearing point engageable with the upper side of the input lever of said linkage system, and said set point lever being movable in proportion to operation of said differential pressure diaphragm means according to the set point of said set point dial and the position of said changeover lever for either direct or reverse action of said flapper valve.

10. In an air conditioning system, a pneumatic control unit for controlling pneumatic output operating pressure having a differential pressure relay unit with a thrust assembly, said control comprising a leakport and a flapper valve therefor, a linkage motion transmitting system actuated by said differential pressure unit, said linkage system having an input lever movable by differential pressure relay unit, said linkage system having an output lever connecting with said flapper valve for controlling the position of said flapper valve proportional to a sensed condition of said element, a single changeover lever in said linkage system adapted to shift said linkage from actuation of said flapper valve in one direction to an actuation thereof in a reverse direction, a pneumatic relay means, said leakport being connected to said relay means, a source of motive fluid supply from a supply line connected to said relay means and an output pressure branch line connected to said supply line, said branch line being connected to suitable control valve means or the like in the said air conditioning system, said single lever being mounted on a bushing rotatable on a concentrically positioned control shaft of set point control means, said set point means including a set point dial turnable with said bushing in said shaft, and a rectangular lever formed on its lower side with a bearing point engageable with the upper side of the input lever of said linkage system, and set point lever being movable in proportion to operation of said differential pressure relay unit according to the set point of said set point dial and the position of said changeover lever for either direct or reverse action of said flapper valve, and a sub-master control means having an output lever formed with a take-off bearing point adjacent an edge thereof on the upper side thereof, said take-off bearing point engaging the lower side of an adjacent corner of said rectangular set point lever, said sub-master control including pressure responsive means and a control dial for regulating the said pressure responsive means and the output of said submaster control to said set point lever.

11. In a pneumatic control apparatus comprising a casing for housing in a compact assembly means adaptable for either modulating or two position control as selected, means for establishing an output pressure variable in response to a condition being measured for the purpose of controlling said condition, said means comprising a superimposed lever system having an input lever, an output lever and a plurality of intermediate levers operatively connected with said input and output levers, a pressure responsive differential diaphragm unit operatively engaged with the input lever of said system, one of said intermediate levers being a set point lever opertively connected to said set point lever for setting the value at which said output pressure is to be established, said set point lever being engageable with said input lever for movement thereby, a pilot valve positioned in said casing above said output lever and having a control means, said control means being movable by said output lever in accordance with the forces applied by said differential diaphragm unit to said input lever and operatively connected intermediate levers, a pneumatic relay having a main fluid supply line and a fluid output line, the output of said output line being proportional to the positioning of said pilot valve control means by said output lever, and feedback means responsive to the output pressure in said output line comprising an adjustable linkage operatively associated with said intermediate levers and said output lever for modulating the action of said output lever on said pilot valve control means, and a throttle control means in said feedback linkage for variably adjusting the operating range of said feedback means, to thereby control the response of said intermediate levers of the system to the initial setting of said set point lever, whereby said desired output pressure is established.

12. In a pneumatic control apparatus having a nozzle and a flapper pilot valve, a feedback means and a remote control means, an adjustable linkage system having an input lever and an output lever, said nozzle and flapper pilot valve being movable relative to each other by said linkage system to control output pressure, said apparatus including a differential pressure input relay, said relay being connected to relatively high and low pressure sources and having thrust means at the input lever of said linkage system, a set point control means including a rectangular set point lever, said set point lever having a plurality of predetermined points of thrust, one of said thrust points being engageable with a thrust point of said input lever, a second of said thrust points being engageable with a lever of said remote control means, and a third intermediate thrust point of said set point lever being connected to a rotatable dial shaft, said set point lever having spaced aligned fourth and fifth thrust points on each side of said dial shaft, and a changeover link swingable on said dial shaft into alignment with either said fourth or said fifth thrust point, a bifurcated lever pivoted at one end above said path of swing of said changeover lever, said bifurcated lever having an intermediate thrust point engageable with a corner of said output lever, cam means on the underside of said arms of the said bifurcated lever, whereby selective engagement of the changeover lever cam with one of the bifurcated lever cams results in a direct or a reverse action of the output lever of the flapper with respect to the said nozzle of said pilot valve, and a throttling range control lever connected from said feedback means to a corner of said output lever, said range control lever being movable to left or right of a neutral pickoff point of the feedback means as required.

13. In a pneumatic control apparatus having a nozzle and a flapper pilot valve, a feedback means and a remote control means, an adjustable linkage system having an input lever and an output lever, said nozzle and flapper pilot valve being movable relative to each other by said linkage system to control output pressure, said apparatus including a differential pressure unit having variable area diaphragms to provide differential area therebetween, said differential unit having a thrust assembly carried by said diaphragms at the input lever of said linkage system, a set point control means including a rectangular set point lever, said set point lever having a plurality of predetermined points of thrust, one of said thrust points being engageable with a thrust point of said input lever, a second of said thrust points being engageable with a lever of said remote control means, and a third intermediate thrust point of said set point lever being connected to a rotatable dial shaft, said set point lever having spaced aligned fourth and fifth thrust points on each side of said dial shaft, and a changeover lever swingable on said dial shaft into alignment with either said fourth or said fifth thrust point, a bifurcated lever pivoted at one end above said path of swing of said changeover lever, said bifurcated lever having an intermediate thrust point engageable with a corner of said output lever, cam means on the upper side of said changeover lever, and cam means on the underside of said arms of the said bifurcated lever, whereby selective engagement of the changeover lever cam with one of the bifurcated lever cams results in a direct or a reverse action of the output lever of the flapper with respect to the said nozzle of said pilot valve, a throttling range control lever connected from said feedback means to a corner of said output lever, said range control link being movable to left or right of a neutral pickoff point of the feedback means as required, and said remote control means comprising a diaphragm connected to a suitable remotely located pressure sensing line, said diaphragm movement being regulated by a remote control dial and lever system, a lever of said system having a thrust point on an upper surface thereof engageable with a thrust point of said set point lever.

References Cited by the Examiner

UNITED STATES PATENTS 2,788,013  4/57  Jordan _____ 137—82
2,984,218  5/61  Christianson _____ 137—596.15

LAVERNE D. GEIGER, *Primary Examiner.*